(12) United States Patent
Jurkovic et al.

(10) Patent No.: US 9,118,230 B2
(45) Date of Patent: Aug. 25, 2015

(54) INTERIOR PERMANENT MAGNET MACHINE

(71) Applicant: GM GLOBAL TECHNOLOGY OPERATIONS LLC, Detroit, MI (US)

(72) Inventors: Sinisa Jurkovic, Sterling Heights, MI (US); Khwaja M. Rahman, Troy, MI (US); Qiang Niu, Novi, MI (US); Peter J. Savagian, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 224 days.

(21) Appl. No.: 13/761,888

(22) Filed: Feb. 7, 2013

(65) Prior Publication Data

US 2014/0217848 A1    Aug. 7, 2014

(51) Int. Cl.
*H02K 1/27*    (2006.01)
*B32B 33/00*   (2006.01)

(52) U.S. Cl.
CPC .............. *H02K 1/2706* (2013.01); *B32B 33/00* (2013.01); *H02K 1/2766* (2013.01)

(58) Field of Classification Search
CPC .................................................... H02K 1/276
USPC ............. 310/156.41, 156.42, 156.36, 156.38, 310/156.39, 156.43, 156.45, 156.53, 310/156.55, 156.56, 156.57
See application file for complete search history.

(56) References Cited

U.S. PATENT DOCUMENTS

| | | | | |
|---|---|---|---|---|
| 6,121,706 | A * | 9/2000 | Nashiki et al. | 310/168 |
| 6,225,724 | B1 * | 5/2001 | Toide et al. | 310/156.53 |
| 6,300,700 | B1 * | 10/2001 | Nishiyama et al. | 310/156.45 |
| 6,555,940 | B2 * | 4/2003 | Naito et al. | 310/156.56 |
| 7,362,025 | B2 * | 4/2008 | Utaka | 310/156.57 |
| 7,459,821 | B2 * | 12/2008 | Ho Cheong et al. | 310/156.57 |
| 7,730,603 | B2 * | 6/2010 | Ward et al. | 29/596 |
| 2002/0036438 | A1 * | 3/2002 | Nishiyama et al. | 310/168 |
| 2003/0011265 | A1 * | 1/2003 | Hattori et al. | 310/156.38 |
| 2003/0020351 | A1 * | 1/2003 | Lee et al. | 310/156.53 |
| 2003/0030343 | A1 * | 2/2003 | Naito et al. | 310/156.56 |
| 2003/0094875 | A1 * | 5/2003 | Sakuma et al. | 310/156.56 |
| 2003/0164655 | A1 * | 9/2003 | Biais et al. | 310/156.53 |
| 2006/0145557 | A1 * | 7/2006 | Weihrauch | 310/156.78 |
| 2006/0170301 | A1 * | 8/2006 | Masuzawa et al. | 310/156.53 |

* cited by examiner

*Primary Examiner* — Naishadh Desai
(74) *Attorney, Agent, or Firm* — Quinn Law Group, PLLC

(57) ABSTRACT

An interior permanent magnet machine includes a stator including a plurality of electrical conductors. The interior permanent magnet machine further includes a rotor concentrically disposed in relation to the stator. The rotor is configured to rotate relative to the stator about a rotational axis and includes a plurality of polar pieces arranged annularly about the rotational axis. At least one of the polar pieces includes a magnetic layer configured to magnetically interact with the electrical conductors. The magnetic layer has a substantially conic section shape.

14 Claims, 2 Drawing Sheets

INTERIOR PERMANENT MAGNET MACHINE

TECHNICAL FIELD

The present disclosure relates to interior permanent magnet (IPM) machines and methods for manufacturing the same.

BACKGROUND

An interior permanent magnet (IPM) machine is a brushless electric motor having permanent magnets embedded in its rotor core. Permanent magnet electric motors are generally reliable, light, and thermally efficient. In the past, however, permanent magnets have primarily been used on small, low-power electric motors, because of the relative difficulty associated with finding a material capable of retaining a high-strength magnetic field, and rare earth permanent magnet technology being in infancy.

Recent advances in material technology have enabled the creation of lower cost high-intensity permanent magnets. These technological advances have facilitated development of compact, high-power permanent magnet machines for high-volume applications, such as for powering a vehicle, i.e. a hybrid or electric vehicle. IPM machines, in particular, are generally characterized by having favorable ratios of output torque versus the motor's physical size, as well as reduced input voltage. IPM machines are typically reliable, in large part because permanent magnets are retained within dedicated slots of the machine's rotor. When supplied with motive energy from an external source, an IPM machine may also function as a generator. As a result, IPM machines have been gaining acceptance in the transportation industry as viable powerplants for electric and hybrid electric vehicles.

SUMMARY

The present disclosure relates to interior permanent magnet machines. In an embodiment, the interior permanent magnet machine includes a stator including a plurality of electrical conductors. The interior permanent magnet machine further includes a rotor concentrically disposed in relation to the stator. The rotor is configured to rotate relative to the stator about a rotational axis and includes a plurality of polar pieces arranged annularly about the rotational axis. At least one of the polar pieces includes a magnetic layer configured to magnetically interact with the electrical conductors. The magnetic layer has a substantially conic section shape.

In an embodiment, the magnetic layer includes a first permanent magnet and a second permanent magnet. The first and second permanent magnets collectively define the substantially conic section shape. The first and second permanent magnets may be bonded magnets. The substantially conic section shape defined by the magnetic layer may be a substantially parabolic shape, a substantially hyperbolic shape, or a substantially semi-elliptical shape.

The rotor may include a first magnetic layer and a second magnetic layer. The second magnetic layer includes a third permanent magnet and a fourth permanent magnet. The third permanent magnet and the fourth permanent magnet may collectively define a substantially semi-elliptical shape. The rotor may further include a third magnetic layer having a fifth permanent magnet and sixth permanent magnet. The fifth and sixth permanent magnets may define a substantially hyperbolic shape. The rotor may further include an intra-polar bridge separating the first permanent magnet from the second permanent magnets. An air gap may be defined between the rotator and the stator. A focal point of the substantially conic section shape, which is defined by the first magnetic layer or the second magnetic layer, may be located in the air gap. The intra-polar bridge may be elongated along a center pole axis that intersects the rotational axis and the focal point.

The present disclosures also relates to vehicles. In an embodiment, the vehicle includes a driveline and an interior permanent magnet machine operatively connected to the driveline. The interior permanent magnet machine includes a stator including a plurality of electrical conductors. The interior permanent magnet machine may further include a rotator at least partly disposed within the stator and configured to rotate relative to the stator. The rotator includes a plurality of magnetic layers. Each magnetic layer has a substantially conic section shape that has a focal point located between the stator and the rotator. Each magnetic layer includes a first curved permanent magnet and a second curved permanent magnet.

In an embodiment, the first and second curved permanent magnets may be bonded magnets. Each magnetic layer may only include the first and second curved permanent magnets. The first curved magnet may be a mirror image of the second curved permanent magnet. The conic section shape defined by each magnetic layer may be a substantially semi-elliptical shape, a substantially hyperbolic shape, or a substantially parabolic shape. The magnetic layers may have substantially different shapes. The magnetic layers may have substantially identical shapes.

The present disclosure also relates to methods of manufacturing an interior permanent magnet machine. In an embodiment, the method includes placing a first bonded magnet in a first rotator cavity of a rotor, and placing a second bonded magnet in a second rotator cavity of the rotor. The first and second bonded magnets collectively define a substantially conic section shape such as a substantially parabolic shape, a substantially hyperbolic shape, or a substantially semi-elliptical shape.

In an embodiment, the method further includes placing a third bonded magnet in a third rotator cavity of the rotator, and placing a fourth bonded magnet in a fourth rotator cavity of the rotator. The third and fourth bonded magnets may collectively define a shape that is different from the substantially conic section shape collectively defined by the first and second bonded magnets.

In an embodiment, the method may further include placing a third bonded magnet in a third rotator cavity of the rotator, and placing a fourth bonded magnet in a fourth rotator cavity of the rotator. The third and fourth bonded magnets may collectively define a shape that is substantially identical to the substantially conic section shape collectively defined by the first and second bonded magnets.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
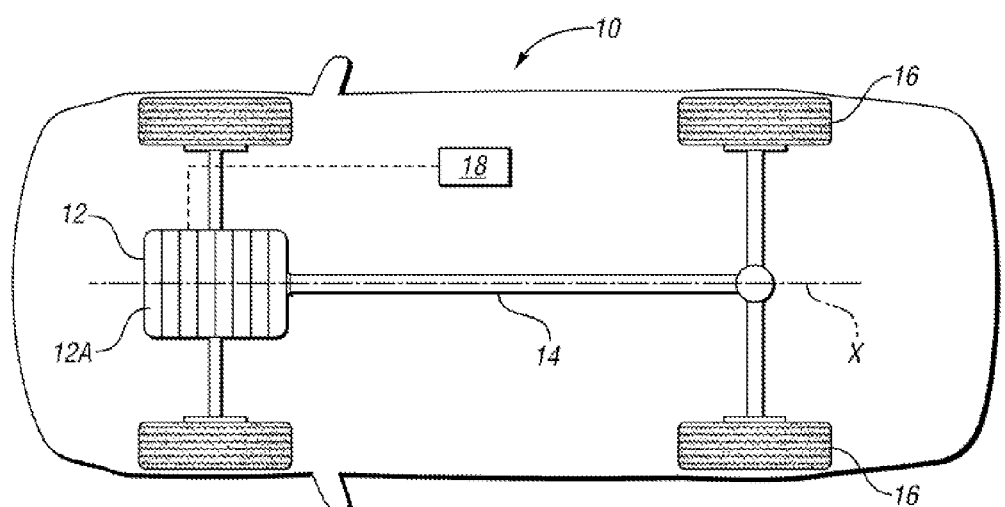
FIG. 1 is a schematic illustration of a vehicle including an interior permanent magnet machine.

Referring to the drawings, wherein like reference numbers refer to like components, FIG. 1 shows a vehicle 10 including an interior permanent magnet (IPM) motor or machine 12 configured to propel the vehicle 10. The IPM machine 12 can be configured to provide torque or force to another component of the vehicle 10, thereby propelling the vehicle 12. Aside from propelling the vehicle 10, the IPM machine 12 can be used to power other suitable apparatus. The IPM machine 12 may be a brushless motor and includes six substantially identical interconnected segments 12A disposed side by side along a rotational axis X, which is defined along the length of the IPM machine 12. It is contemplated, however, that the IPM machine 12 may include more or fewer segments 12A. The number of interconnected segments 12A is directly related to the torque the IPM machine 12 is capable of producing for powering the vehicle 10.

The vehicle 10 includes a driveline 14 having a transmission and a driveshaft (not shown). The driveline 14 is operatively connected between the IPM machine 12 and driven wheels 16 via one or more suitable couplers such as constant velocity and universal joints (not shown). The operative connection between IPM machine 12 and driveline 14 allows the IPM machine 12 to supply torque to the driven wheels 16 in order to propel the vehicle 10.

In addition to the driveline 14, the vehicle 10 includes an energy-storage device 18 configured to supply electrical energy to the IPM machine 12 and other vehicle systems (not shown). To do so, the energy-storage device 18 is electrically connected to the IPM machine 12. Due to this electrical connection, the IPM machine 12 is configured to receive electrical energy from the energy-storage device 18 and can operate as a generator when driven by a motive energy source of the vehicle 10 that is external to the IPM machine 12. Such external motive energy may be, for example, provided by an internal combustion engine (not shown) or by the driven wheels 16 via vehicle inertia.

Figure 2:
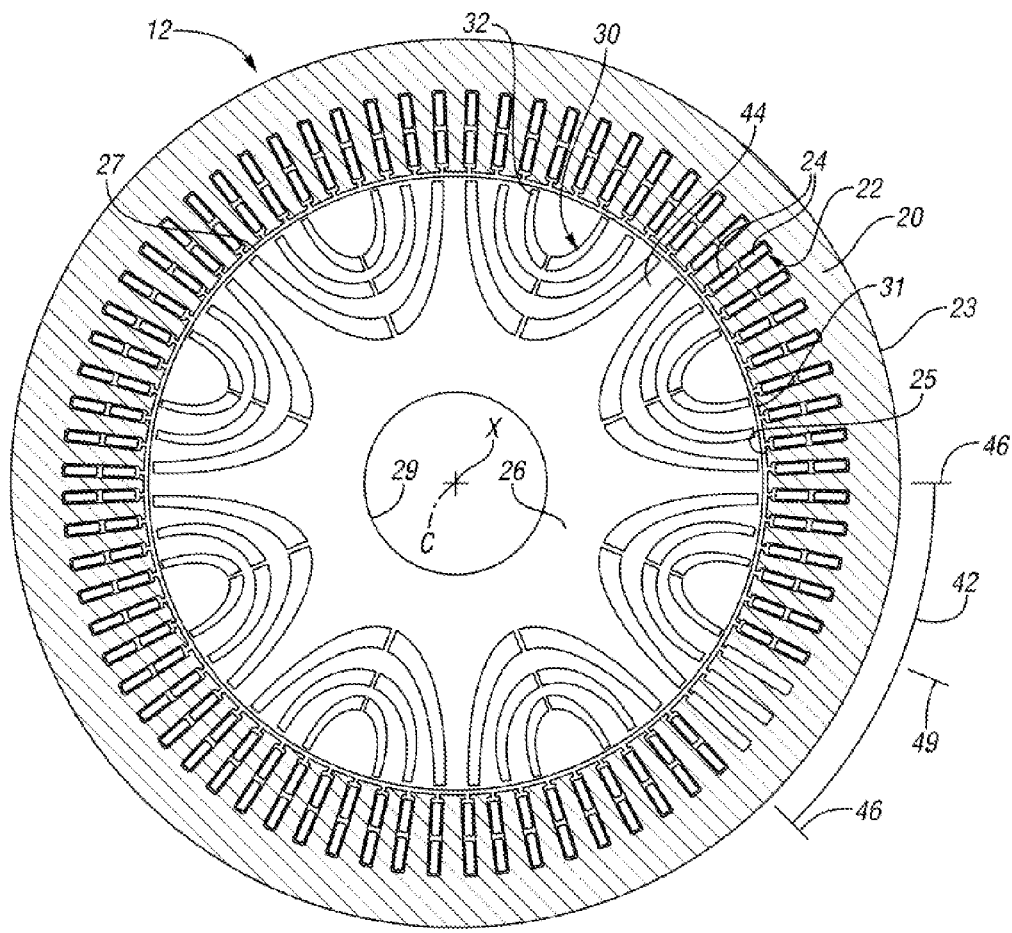
FIG. 2 is a front cross-sectional view of the interior permanent magnet machine schematically shown in FIG. 1.

FIG. 2 shows a cross-sectional view of a portion of IPM machine 12 schematically shown in FIG. 1. The IPM machine 12 includes a stator 20 having apertures 22 and electrical conductors 24 disposed in the apertures 22. The electrical conductors 24 are electrically connected to the energy-storage device 18 (FIG. 1). This electrical connection allows the energy-storage device 18 (FIG. 1) to supply electrical energy to the electrical conductors 24. The stator 20 may have a substantially annular shape and may be disposed around the rotational axis X. Furthermore, the stator 20 may define an outer stator surface 23 and an inner stator surface 25 opposite the outer stator surface 23. Both the outer stator surface 23 and the inner stator surface 25 may define a circumference around the rotational axis X. The apertures 22 may be disposed closer to the inner stator surface 25 than the outer stator surface 23 and each is shaped and sized to receive one or more electrical conductors 24. As used herein, the term "apertures" includes without limitation slits, slots, openings, or any cavity in the stator 20 configured and shaped to receive at least one electrical conductor 24. The electrical conductors 24 may be made of a suitable electrically conductive material such as metallic materials like copper and aluminum. The electrical conductors 24 can be configured as bars or windings and may have any suitable shape such as substantially rectangular, cuboid, and cylindrical shapes. Irrespective of its shape, each electrical conductor 24 is shaped and sized to be received in one aperture 22. Although the drawings show the apertures 22 containing two electrical conductors 24, each aperture 22 may contain more or fewer electrical conductors 24.

The IPM machine 12 further includes a rotor 26 disposed around the rotational axis X and within the stator 20. The stator 20 may be disposed concentrically with the rotor 26. The rotor 26 may be wholly or partly formed of a metallic material such as stainless steel, may have a substantially annular shape, and defines a plurality of rotor cavities 30 and a plurality of curved permanent magnets 32 disposed within the rotor cavities 30. The curved permanent magnets 32 are tightly fitted in the rotator cavities 30 and include an alloy of a rare earth element such as neodymium, samarium, or any other suitable ferromagnetic material. Suitable ferromagnetic materials include a Neodymium Iron Boron (NdFeB) alloy and a Samarium Cobalt (SmCo) alloy. The curved permanent magnets 32 may be arranged annularly around the rotational axis X and are configured to magnetically interact with the electrical conductors 24. During operation of the IPM machine 12, the rotor 26 revolves relative to the stator 20 around the rotational axis X in response to the magnetic flux developed between the electrical conductors 24 and the curved permanent magnets 32, thereby generating drive torque to power the vehicle 10.

In the depicted embodiment, the rotor 26 defines an outer rotor end 27 and an inner rotor end 29 opposite the outer rotor end 27. Both the outer rotor end 27 and the inner rotor end 29 may define a circumference around the rotational axis X. The IPM machine 12 may define an air gap 31 between the inner stator surface 25 and the outer rotor end 27. The air gap 31 may have a substantially annular shape and spans around the rotor 26. The rotor 26 includes a plurality of poles pieces 42 arranged annularly around a rotor center C, which may coincide with the rotational axis X. Though the drawings show eight polar pieces 42, the rotor 26 may include more or fewer polar pieces 42. Inter-polar bridges 44 separate consecutive polar pieces 42 and can be elongated along respective inter-polar axes 46. Each inter-polar axis 46 extends through the rotator center C and substantially through the middle of a respective inter-polar bridge 44 and defines the demarcation between two consecutive polar pieces 42. Consecutive polar pieces 42 have opposite polarities. Each polar piece 42 further defines a center pole axis 49 extending through the rotator center C and substantially through the middle of said polar piece 42. The center pole axis 49 of each polar piece 42 may also intersect the rotational axis X.

Figure 3:
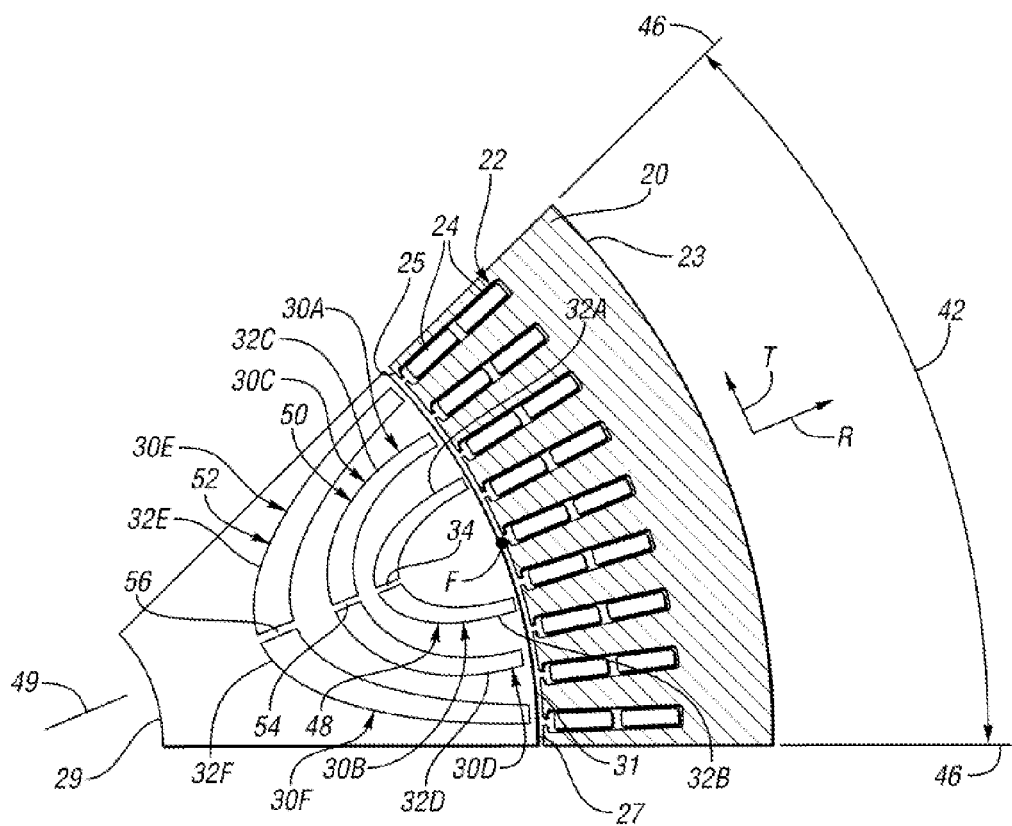
FIG. 3 is an enlarged cross-sectional view of a polar piece of the interior permanent magnet machine shown in FIG. 2.

With reference to FIG. 3, each polar piece 42 includes a plurality of curved permanent magnets 32, which are arranged in magnetic layers 48, 50, and 52 that are spaced apart from one another along a radial direction, which is indicated by arrow R. Specifically, each polar piece 42 includes a first magnetic layer 48, a second magnetic layer 50, and a third magnetic layer 52. Although the drawings show three magnetic layers 48, 50, and 52, each polar piece 42 may include more or fewer magnetic layers. Each magnetic layer 48, 50 or 52 may include a pair of curved permanent magnets 32 that are spaced apart from each other along a tangential direction, which is indicated by arrow T. The tangential direction (as indicated by arrow T) may be substantially perpendicular to the radial direction (indicated by arrow R). While the drawings show that each magnetic layer 48, 50, and 52 only has two curved permanent magnets 32, the magnetic layers 48, 50, and 52 may each include more or fewer curved permanent magnets 32. Each curved permanent magnet 32 may be a monolithic structure.

All or some of the curved permanent magnets 32 may be bonded magnets. As used herein, the term "bonded magnets"

excludes sintered magnets. Sintered magnets are prepared by melting the raw material in a furnace, casting the melted raw material into a mold, and cooling the raw material to form ingots. The ingots are then pulverized, and the resulting powder subsequently undergoes a liquid phase sintering process, whereby the powder is magnetically aligned into dense blocks. These blocks are then heat-treated, cut to shape, surface treated, and magnetized. In contrast, to produce a bonded magnet, a thin ribbon of ferromagnetic material (such as a neodymium alloy) is melt-spun. This ribbon is then pulverized, mixed with a polymer, and then either compression or injection molded into bonded magnets. Bonded magnets offer less flux than sintered magnets and are therefore less powerful than sintered magnets. However, bonded magnets can be formed into complexly shaped parts and suffer from lower eddy current losses than sintered magnets.

It is important to form complexly shaped permanent magnets (such as curved magnets 32) to increase the reluctance torque of the IPM machine 12 and therefore maximize its power output. Accordingly, at least one of the magnetic layers 48, 50, or 52 has a substantially conic section shape. As used herein, the term "conic section shape" includes substantially parabolic, substantially hyperbolic, and substantially semi-elliptical shapes and excludes substantially semi-circular shapes. Although in strict mathematical sense the term "semi-elliptical shape" may include semi-circular shapes, as used herein, the term "semi-elliptical shape" excludes semi-circular shapes. Similarly, in the present disclosure, the term "substantially semi-elliptical shape" excludes substantially semi-circular shapes. Due to their substantially conic section shapes, the magnetic layer 48, 50, 52 can be disposed farther into the inner rotor end 29, thereby improving the reluctance torque of the IPM machine 12.

The first magnetic layer 48 may only include a first permanent magnet 32A disposed in a first rotor cavity 30A and a second permanent magnet 32B disposed in a second rotor cavity 30B. Nonetheless, the first magnetic layer 48 may include more or fewer curved permanent magnets 32. A first intra-polar bridge 34 separates the first permanent magnet 32A from the second permanent magnet 32B along the tangential direction indicated by arrow T. Moreover, the first intra-polar bridge 34 can be elongated along the center pole axis 49 and enhances the structural integrity of the rotor 26.

In the depicted embodiment, the first permanent magnet 32A and the second permanent magnet 32B may jointly define a substantially parabolic shape. Accordingly, the first magnetic layer 48 may have a substantially parabolic shape. The substantially parabolic shape of the first magnetic layer 48 may be defined about a focus or focal point F. The focal point F may be located in the air gap 31 and is the focus of the parabola collectively defined by the first permanent magnet 32A and the second permanent magnet 32B. The center pole axis 49 intersects the focal point F and coincides with an axis of symmetry of the parabola collectively defined by the first permanent magnet 32A and the second permanent magnet 32B. As such, the first permanent magnet 32A may be a mirror image of the second permanent magnet 32B. The first intra-polar bridge 34 is disposed between the first permanent magnet 32A and the second permanent magnet 32B and defines the vertex of the parabola defined by the first magnetic layer 48. The first magnetic layer 48 may alternatively have a substantially hyperbolic or substantially semi-elliptical shape. In either case, the focal point F may define the focus of the hyperbola or semi-ellipse collectively defined by the first permanent magnet 32A and the second permanent magnet 32B, and the center pole axis 49 may define the axis of symmetry of the hyperbola or parabola defined by the first magnetic layer 48.

At least part of the second magnetic layer 50 is disposed closer to the inner rotor end 29 than the first magnetic layer 48. The second magnetic layer 50 may only include a third permanent magnet 32C disposed in a third rotor cavity 30C and a fourth permanent magnet 32D disposed in a fourth rotor cavity 30D. It is contemplated, however, that the second magnetic layer 50 may include fewer or more permanent magnets. A second intra-polar bridge 54 separates the third permanent magnet 32C from the fourth permanent magnet 32D along the tangential direction, which is indicated by arrow T. Furthermore, the second intra-polar bridge 54 can be elongated along the center pole axis 49 and enhances the structural integrity of the rotor 26.

In the depicted embodiment, the third permanent magnet 32C and the fourth permanent magnet 32D collectively define a substantially semi-elliptical shape. Accordingly, the second magnetic layer 50 has a substantially semi-elliptical shape. The focal point F is the focus of the semi-ellipse defined by the second magnetic layer 50, and the center pole axis 49 is the axis of symmetry of the semi-ellipse defined by the second magnetic layer 50. As such, the third permanent magnet 32C is a mirror image of the fourth permanent magnet 32D. The second intra-polar bridge 54 is disposed between the third permanent magnet 32C and the fourth permanent magnet 32D and defines the vertex of the semi-ellipse defined by the second magnetic layer 50. The second magnetic layer 50 may alternatively have a substantially parabolic or substantially hyperbolic shape. In either case, the focal point F may define the focus of the parabola or hyperbola defined by the second magnetic layer 50, and the center pole axis 49 defines the axis of symmetry of the parabola or hyperbola defined by the second magnetic layer 50.

At least a portion of the third magnetic layer 52 is disposed closer to the inner rotor end 29 than the second magnetic layer 50. The third magnetic layer 52 includes a fifth permanent magnet 32E disposed in a fifth rotor cavity 30E and a sixth permanent magnet 32F disposed in a sixth rotor cavity 30F. Although the drawings show that the third magnetic layer 52 only has two permanent magnets, the third magnetic layer 52 may include more or fewer permanent magnets. A third intra-polar bridge 56 separates the fifth permanent magnet 32E from the sixth permanent magnet 32F along the tangential direction, which is indicated by arrow T. Moreover, the third intra-polar bridge 56 can be elongated along the center pole axis 49 and enhances the structural integrity of the rotor 26.

The fifth permanent magnet 32E and the sixth permanent magnet 32F jointly define a substantially hyperbolic shape. Accordingly, the third magnetic layer 52 has a substantially hyperbolic shape. The focal point F is the focus of the hyperbola defined by the third magnetic layer 52, and the center pole axis 49 is the axis of symmetry of the hyperbola defined by the third magnetic layer 52. Thus, the fifth permanent magnet 32E is a mirror image of the sixth permanent magnet 32F. The third intra-polar bridge 56 is disposed between the fifth permanent magnet 32E and the sixth permanent magnet 32F and defines the vertex of the hyperbola defined by the third magnetic layer 52. Instead of a substantially hyperbolic shape, the third magnetic layer 52 may have a substantially semi-elliptical or parabolic shape. In any case, the focal point F may define the focus of the semi-ellipse or parabola defined by the third magnetic layer 52, and the center pole axis 49 may define the axis of symmetry of the semi-ellipse or parabola defined by the third magnetic layer 52.

While FIG. 3 shows the polar piece 42 having magnetic layers with three different shapes, any of the polar pieces 42 of the rotor 26 may include substantially identically shaped magnetic layers. For example, any polar piece 42 may include three magnetic layers each having substantially parabolic shapes. It is envisioned that any polar piece 42 may include two magnetic layers having substantially identical shapes and a third magnetic layer with a different shape. For instance, one of the polar pieces 42 may include two magnetic layers having substantially hyperbolic shapes and a third magnetic layer having a substantially semi-elliptical shape. Alternatively, one or more of the polar pieces 42 may include two magnetic layers having substantially parabolic shapes and a third magnetic layer having a substantially hyperbolic shape. Any polar piece 42 may also include magnetic layers each having a substantially different shape.

It is also envisioned that the magnetic layers may be arranged in different positions in relation to the rotator center C. For example, at least a portion of the third magnetic layer 52 may be disposed closer to the outer rotor end 27 than any other portion of the first magnetic layer 48. Additionally, the polar pieces 42 may include different combinations of the first magnetic layer 48, second magnetic layer 50, and third magnetic layer 52.

The present disclosure also relates to methods of manufacturing the IPM machine 12. By using permanent bonded magnets, the manufacturing process is simplified and, therefore, the manufacturing costs are minimized. In an exemplary embodiment, the method of manufacturing the IPM machine 12 includes placing a first bonded magnet (such as the first permanent magnet 32A) in the first rotor cavity 30A of the rotor 26; and placing a second bonded magnet (such as the second permanent magnet 32B) in the second rotor cavity 30B. In this method, the first and second bonded magnets (such as first and second permanent magnets 32A, 32B) collectively define a substantially conic section shape. This substantially conic section shape may be a substantially parabolic shape, a substantially hyperbolic shape, or substantially semi-elliptical shape. This manufacturing method may further include placing a third bonded magnet (such as the third permanent magnet 32C) in the third rotor cavity 30C and placing a fourth bonded magnet (such as the fourth permanent magnet 32D) in the fourth rotor cavity 30D. The third and fourth bonded magnets (such as the third and fourth permanent magnets 32C, 32D) collectively define a shape that is substantially identical to the substantially conic section shape collectively defined by the first and second bonded magnets (such as the first and second permanent magnets 32A, 32B). Alternatively, the third and fourth bonded magnets (such as the third and fourth permanent magnets 32C, 32D) may collectively define a shape that is different from the shape collectively defined by the first and second bonded magnets (such as the first and second permanent magnets 32A, 32B).

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An interior permanent magnet machine comprising:
a stator including a plurality of electrical conductors; and
a rotor concentrically disposed in relation to the stator, the rotor configured to rotate relative to the stator about a rotational axis and including a plurality of polar pieces arranged annularly about the rotational axis, wherein each of the polar pieces includes a first magnetic layer, a second magnetic layer, and a third magnetic layer, each of the first, second, and third magnetic layers is configured to magnetically interact with the electrical conductors, the first magnetic layer has a parabolic shape, the second magnetic layer has semi elliptical shape, the third magnetic layer has a hyperbolic shape, and the second magnetic layer is disposed between the first magnetic layer and the third magnetic layer.

2. The interior permanent magnet machine of claim 1, wherein the first magnetic layer includes a first permanent magnet and a second permanent magnet, and the first and second permanent magnets collectively defining the parabolic shape.

3. The interior permanent magnet machine of claim 2, wherein the first and second permanent magnets are bonded magnets.

4. The interior permanent magnet machine of claim 2, wherein the rotor further includes an intra-polar bridge separating the first permanent magnet from the second permanent magnets.

5. The interior permanent magnet machine of claim 4, wherein an air gap is defined between the rotor and the stator, and a focal point of the parabolic shape is located in the air gap.

6. The interior permanent magnet machine of claim 5, wherein the intra-polar bridge is elongated along a center pole axis that intersects the rotational axis and the focal point.

7. The interior permanent magnet machine of claim 1, wherein the second magnetic layer includes a first permanent magnet and a second permanent magnet collectively defining the semi-elliptical shape.

8. The interior permanent magnet machine of claim 1, wherein the third magnetic layer includes a first permanent magnet and a second permanent magnet collectively defining the hyperbolic shape.

9. A vehicle comprising:
a driveline; and
an interior permanent magnet machine operatively connected to the driveline, the interior permanent magnet machine including:
a stator including a plurality of electrical conductors; and
a rotator at least partly disposed within the stator and configured to rotate relative to the stator, wherein the rotator includes a first magnetic layer, a second magnetic layer, and a third magnetic layer, each of the first, second, and third magnetic layers has a conic section shape that has a focal point located between the stator and the rotator, the first magnetic layer has a parabolic shape, the second magnetic layer has a semi-elliptical shape, the third magnetic layer has a hyperbolic shape, and the second magnetic layer is disposed between the first magnetic layer and the third magnetic layer.

10. The vehicle of claim 9, wherein the first, second, and third magnetic layers include bonded magnets.

11. The vehicle of claim 9, wherein each of the first, second, and third magnetic layers only includes a first and second permanent magnets.

12. The vehicle of claim 11, wherein the first magnet is a mirror image of the second permanent magnet.

13. The vehicle of claim 9, wherein the magnetic layers have substantially different shapes.

14. An interior permanent magnet machine comprising:
a stator including a plurality of electrical conductors; and a rotor concentrically disposed in relation to the stator, the rotor configured to rotate relative to the stator about a rotational axis and including a plurality of polar pieces arranged annularly about the rotational axis;

wherein each of the plurality of polar pieces includes:
a first magnetic layer having a parabolic shape;
a second magnetic layer having a semi-elliptical shape; and
a third magnetic layer having a hyperbolic shape, wherein the second magnetic layer is disposed between the first magnetic layer and the second magnetic layer.

\* \* \* \* \*